United States Patent [19]

Wong et al.

[11] Patent Number: 4,525,051
[45] Date of Patent: Jun. 25, 1985

[54] STILL CAMERA WITH PRESSURE PLATE CONTROL DEVICE

[75] Inventors: Wan C. Wong, North Point, Hong Kong; Shigeru Oshima, Tokyo, Japan

[73] Assignee: W. Haking Enterprises, Limited, Hong Kong

[21] Appl. No.: 477,246

[22] Filed: Mar. 21, 1983

[51] Int. Cl.³ .............................................. G03B 17/28
[52] U.S. Cl. .................................................... 354/203
[58] Field of Search ................................ 354/203, 288

[56] References Cited

U.S. PATENT DOCUMENTS

| | | | |
|---|---|---|---|
| 1,864,100 | 6/1932 | Steiner | 354/203 |
| 4,324,476 | 4/1982 | Seely | 354/288 |
| 4,339,193 | 7/1982 | Harvey | 354/288 |
| 4,457,607 | 7/1984 | Sekine et al. | 354/203 |

FOREIGN PATENT DOCUMENTS

| | | | |
|---|---|---|---|
| 536021 | 4/1930 | Fed. Rep. of Germany | 354/203 |
| 109932 | 7/1982 | Japan | 354/288 |
| 563884 | 9/1944 | United Kingdom | |
| 1238333 | 7/1971 | United Kingdom | |
| 2093200 | 8/1982 | United Kingdom | |

*Primary Examiner*—John Gonzales
*Attorney, Agent, or Firm*—Russell E. Hattis; Ralph R. Rath

[57] ABSTRACT

A still camera includes a housing having a film chamber for receiving a film cartridge having a film leader with the chamber defining a film path communicating with an edge of the housing through a channel. The film chamber also has a cavity at one end of the film path for drop-in loading of the cartridge in the direction of the plane of the film and a cavity at the opposite end housing a take-up spool. An imaging area is located at one side of the film path and a pressure plate is generally aligned with the imaging area on opposite side of the film path and biased towards the imaging area. A mechanism is provided for moving the pressure plate away from the imaging area to accommodate film loading and unloading, as well as film rewind.

5 Claims, 13 Drawing Figures

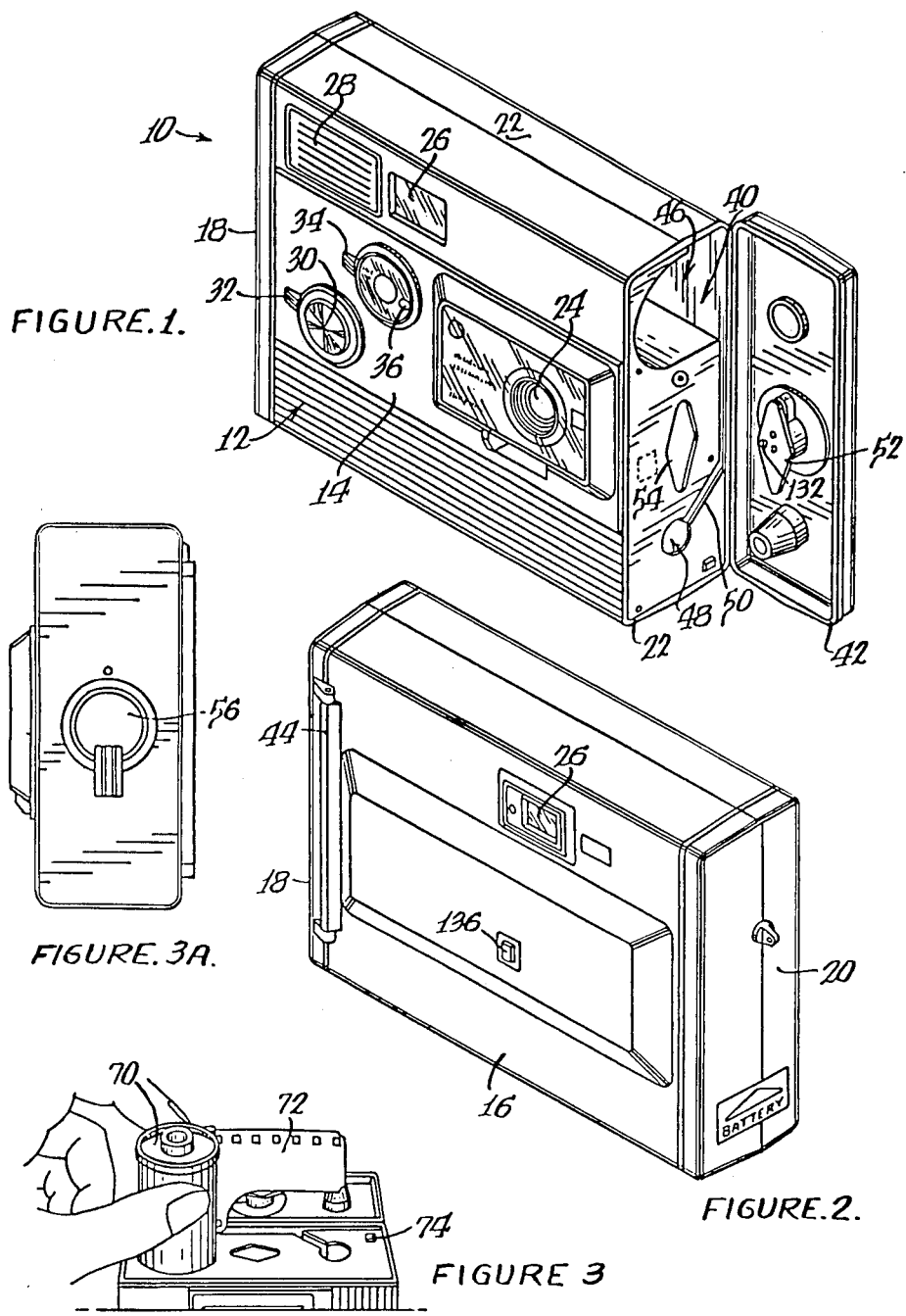

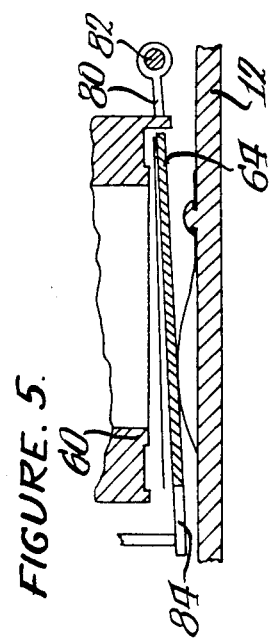
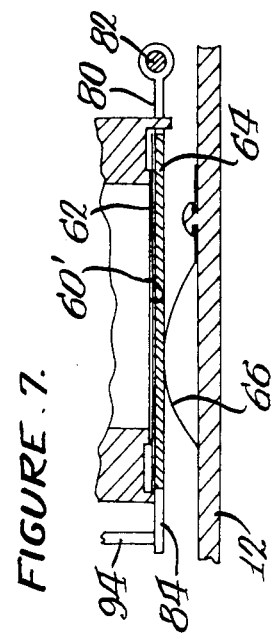
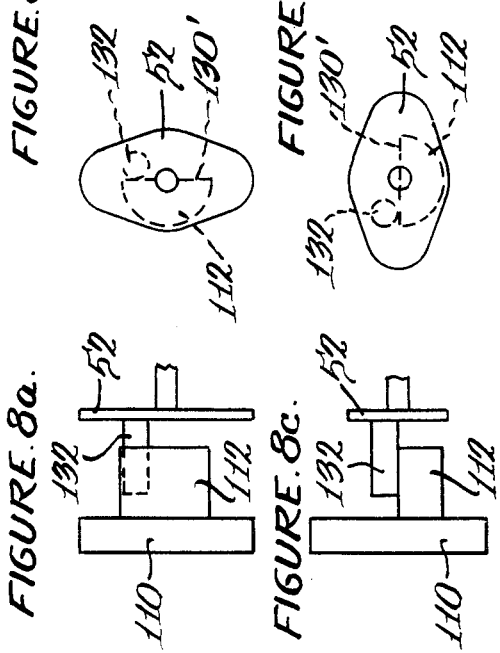
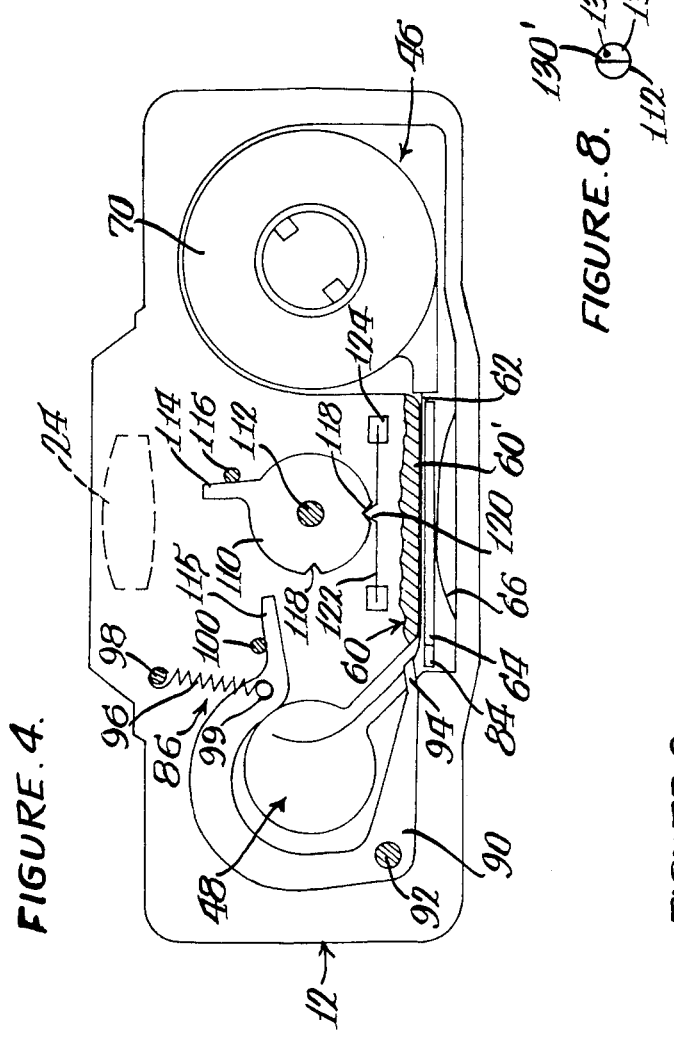
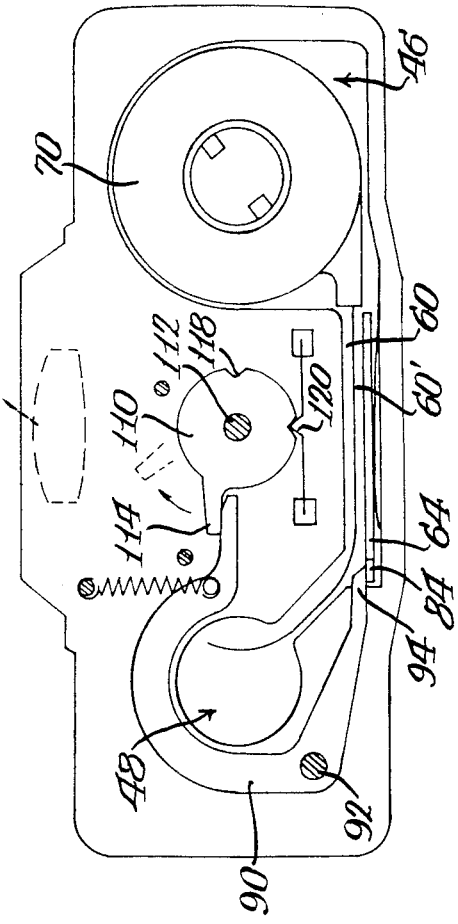

4,525,051

STILL CAMERA WITH PRESSURE PLATE CONTROL DEVICE

DESCRIPTION

1. Technical Field

The present invention relates generally to still cameras of the 35 mm type and, more particularly, to a control means for releasing the pressure plate during loading and unloading of film in the camera.

2. Background Prior Art

Thirty-five millimeter cameras have been in existence for a number of years and have become very popular in the industry. Usually, the film for such camera is packaged into a cassette or cartridge and has a tongue portion or leader extending therefrom. In most such cameras, the camera has a door which extends across the rear of the camera to cover a film-receiving chamber and is opened to insert the film cartridge into the chamber which receives the cartridge and leader inserted into the chamber in a direction transverse to the plane of the film. In such cameras, the user manually inserts the end of the film leader into a slot of a take-up spool in the chamber. The film has perforations on at least one edge thereof and the take-up spool has a projection that catches with a film perforation when the take-up spool is rotated manually or automatically.

There has been proposed a 35 mm still camera which incorporates a feature which is referred to as a "drop-in" film loading feature. This type of camera has a cartridge-receiving cavity and a film leader-receiving channel joining said cavity. The cavity and channel are adapted to receive the cartridge and leader dropped into the same in the direction of the film plane. This cavity and channel extend from one face or edge of the camera housing into the film chamber area which defines the desired film path. The leader end-receiving slot of the take-up spool must be initially manually aligned with the end of the portion of the leader-receiving channel in the film path so that the leader end will drop into the take-up spool slot.

A drop-in loading camera is particularly useful in a half-frame 35 mm camera where the picture frames are one half the size of a full 35 mm frame. In such case, the full frame is split transversely to the length of a full frame so that the half frame has about the same proportions of length to width in a direction across rather than along the length of the film as does a full 35 mm frame. In such case, if the drop-in film loading side of the camera is the vertical side of the camera, rather than the rear or top thereof, the film extends and is advanced vertically rather than horizontally past the imaging area. The long dimension of a half frame picture is then horizontal when the camera is held in a normal manner to obtain a similar frame orientation for a full frame 35 mm camera. The half frame drop-in loading type camera described, which provides twice the number of pictures than a full frame 35 mm camera, is the type of camera to which the present invention is applied in the exemplary form of the invention to be described, although the invention is also applicable to drop-in loaded full size 35 mm cameras.

In all cameras, it is essential that the film be held in a fixed film plane in the imaging area during the exposure process. For this purpose, most conventional 35 mm rear loaded cameras incorporate a pressure plate in the film chamber door so that when the door is closed the pressure plate will press the film against support surfaces in the film plane and surrounding the imaging area.

However, in drop-in loaded cameras as described, the film chamber door faces the edge of the film and so a releasable pressure plate on such a door is useless. The pressure plate in such a camera is permanently located in the leader-receiving channel described, and makes it difficult, however, to drop-load the film leader into the channel because the pressure plate hinders the free entry of the film leader into the leader-receiving slot.

Some of the newer types of still cameras have motor-driven take-up and cartridge spools forming what is referred to as "reverse film transport systems". In these types of cameras, as soon as a film chamber door is closed, the motor-driven film transport system is started to drive the take-up spool at a high speed to pre-wind and transport the entire film, except the rear end portion thereof locked to the supply spool in the film cartridge. The camera is then automatically set to a rewind and reverse film transport mode, and as an exposure is taken, one frame of film is rewound into the cartridge so that there is no possibility of ruining the already-exposed part of the film upon accidental opening of the film chamber door. A permanently mounted and fully operative pressure plate in the leader-receiving channel of a drop-in loaded camera in a reverse film transport system camera is especially undesirable during the high speed pre-wind operation because the pressure plate friction on the film can cause undue drag on the motor and film damage.

SUMMARY OF THE INVENTION

According to one of the features of the present invention, a drop-in loaded camera is provided with a pressure plate in the leader-receiving channel thereof, and manually operable means, such as means responsive to the opening of the film chamber door, for retracting the pressure plate away from its normal operative position so it does not impede the insertion of the film leader into the leader-receiving channel. After the door is reclosed and during the high speed pre-wind operation carried out as described, the pressure plate remains in its retracted position, until the same or different manually operable or other means, is operated to return the pressure plate to its operative position.

In accordance with a specific aspect of the invention, the pressure plate is pivotally mounted along one edge in the housing, and is biased by a spring towards the imaging area with a mechanism cooperating with the opposite edge of the pressure plate to pivot the pressure plate away from the imaging area for loading and unloading the film and during a pre-wind operation. The mechanism for pivoting the pressure plate may include a lever pivotally supported in the housing and means for pivoting the lever into and out of engagement with the pressure plate. The lever is moved between positions preferably by a control knob that extends outside the housing for ready access by the user. The control knob is preferably part of the locking mechanism for the film chamber door. Thus, when the film is to be removed and replaced with new film, all the operator has to do is to turn the control knob to open the film chamber door, which moves the pressure plate away from the film plane so that the exposed film cartridge can readily be removed and a new film cartridge dropped into place within said cartridge-receiving cavity and leader-receiving channel.

The above and other features and advantages of the invention will become apparent upon making reference to the specification to follow, the drawings and the claims.

BRIEF DESCRIPTION OF SEVERAL VIEWS OF DRAWINGS

FIG. 1 is a front perspective view of the still camera having the present invention incorporated therein, with the film chamber door in the open position;

FIG. 2 is a rear perspective view of the camera;

FIG. 3 is a partial fragmentary view of a portion of one side of the housing having the film chamber door in an open position and the film aligned for insertion into the camera;

FIG. 3A is an end view of the film chamber door end of the camera;

FIG. 4 is an end view of the side of the camera having the film chamber door with the door removed;

FIG. 5 is an enlarged fragmentary cross-sectional view of the imaging area of the camera with the pressure plate in a released position;

FIG. 6 is a view similar to FIG. 4 showing the pressure plate and its moving mechanism in a released position;

FIG. 7 is a view similar to FIG. 5 showing the pressure plate in the operative position; and, FIG. 8 is an end view of the pin mounted on the control member;

FIG. 8a is side view of the interconnection between the film chamber door latching member and the control member;

FIG. 8b is an end view of the structure shown in FIG. 8a in one position;

FIG. 8c is a side view of the latch and control member in an unlocked position; and, FIG. 8d is an end view of the structure shown in FIG. 8c.

DETAILED DESCRIPTION OF EXEMPLARY EMBODIMENT OF INVENTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

FIGS. 1 and 2 show a half frame still camera, generally designated by reference numeral 10, which utilizes the conventional 35 mm film. Still camera 10 includes a housing 12 having a front surface 14, a rear surface 16, opposite side surfaces 18 and 20, and top and bottom surfaces 22. The camera 10 incorporates many common features that are now found on existing 35 mm cameras which will now be generally described.

Camera 10 incorporates a lens 24, a viewfinder eyepiece 26 and a built-in unit flash 28. However, as shown in FIG. 1, the lens 24 is offset from the center of the camera, for a purpose that will be described later. Camera 10 also incorporates a shutter release button 30, a mode selector switch 32, a film speed setting lever 34, and a film speed window 36 giving an indication of the setting of the film speed that has been selected.

According to one aspect of the present invention, the film compartment or chamber 40 is located along one side 20 of the camera housing 12 and is enclosed by a film chamber door 42 which is hinged to the housing by a hinge 44 (FIG. 2) along one vertical edge thereof. The film chamber incorporates an upper cavity 46 for receiving a film cartridge or cassette and a lower cavity 48 which houses a take-up reel or spool (not shown). Cavities 46 and 48 are interconnected by an elongated channel 50. The film thus traverses the camera in a vertical direction. The door 42 is held in a locked position by a diamond-shaped (or other non-circular) shaped latching member 52 received into a correspondingly shaped opening 54 in the end wall 20 of the housing 14. The latching mechanism 52 is moved between open and closed positions through a control knob 56 that is located outside of the film chamber door 42.

As illustrated in FIG. 4, the camera has an imaging area 60 with a film plane surface 60' that is generally aligned with lens 24 and is located on one side of the film path 62. A pressure plate 64 is normally biased towards the imaging area 60 by a biasing spring 66 which maintains the film in engagement with the film plane surface 60' during the exposure of the film therein. As indicated above, the use of drop-in loading has significant advantages over the cameras of the type having rear chamber door loading, as is now conventional. With the film path being in a vertical position, the spacing between the film cavity and the take-up spool cavity is reduced to approximately one-half the distance that is found in conventional rear compartment film cavities, which in turn reduces the length of the leader necessary for threading the leader or tongue portion of the film into the take-up spool.

In the drop-in loading system disclosed and described, the operation of the loading of the camera becomes a very simple expedient and reduces the possibility of misloading the camera to a minimum. Film loading may be accomplished by orienting the camera with the film chamber side of the camera facing upwardly (FIG. 3), opening the chamber door 42 and dropping the film cartridge 70 into the supply cavity 46 with the film leader or tongue portion 72 of the film passing into the channel 50. In order to insure that the proper amount of lead portion of the film is exposed, the side 20 of the camera housing has an identifying indicia or marker 74 so that the user can pull the free end of the film to the identifying marker 74, to provide the proper length of film necessary to have the film leader received into the slot (not shown) of the take-up spool which is manually (or automatically) aligned with the end portion 50a of slot 50 (See copending application Ser. No. 477,247, filed Mar. 21, 1983, and entitled Automatic Slot Positioning Device for Camera Take-up Spool, which is incorporated by reference herein which discloses means for providing such automatic alignment and automatic pre-wind and unwinding of the film, as previously described.)

According to the present invention, the camera 10 incorporates a simple mechanical system which is capable of automatically releasing the pressure plate away from the film path a sufficient distance to create a clearance space for free movement of the film into the film path. As indicated in FIGS. 4–7, the pressure plate 64 has an extension 80 extending from one edge of the plate and extension 80 is pivoted about a pin 82 that is fixed within the camera housing 14. The opposite edge of pressure plate 64 also has an extension 84 extending therefrom and a moving mechanism or means 86 cooperates with extension 84 to pivot the pressure plate from the position illustrated in FIG. 7 to the position illustrated in FIG. 5. In the embodiment illustrated in FIG. 5, adequate clearance is developed between the pressure plate 64 and the film plane surface 60' to allow the film to be dropped therein without any interference.

The moving mechanism 86 may take any number of forms, but for purposes of simplicity, the moving mechanism is preferably an integral part of the latch mechanism 52 so that the pressure plate will automatically be moved to a released position whenever the film chamber door 42 is opened. For this purpose, the moving means 86 incorporates a generally C-shaped lever 90 that is pivoted about a pin 92 that is fixed within housing 12. Lever 90 has one end portion 94 aligned with extension 84 and is normally biased to the first position illustrated in FIG. 4 by a biasing spring 96 that extends between a pin 98 on housing 12 and a pin 99 on the opposite end of lever 90. Spring 96 thus biases the lever 90 into engagement with a pin 100 that is located or fixed on the housing and, in this position, the end portion 94 of lever 90 is spaced from the extension 84 so that biasing spring 66 biases pressure plate 64 toward imaging area 60 to press film in the film path against film plane surface 60'. The moving means 86 also incorporates a control means for moving lever 90 from the normally biased first or released position shown in FIG. 4 to a second position shown in FIG. 6 where the pressure plate is released from the film pressing position. The control means preferably includes a member 110 rotatable about a fixed axis defined by pin 112 and having a lug 114 extending from the periphery thereof which is radially aligned with an upper end portion 115 of lever 90. Control means 110 is biased to a first position (FIG. 4) by a spring (not shown) against a stop 116 and manually movable to a second position (FIG. 6). These two positions are determined by detents-receiving notches 118 on the periphery of member 110 that receive a detent 120 which is part of a tension spring 122 extending between two support blocks 124.

The control means can be moved from the position shown in FIG. 4 to the detented or latched pressure plate releasing position shown in FIG. 6 by a knob which may extend out of the housing for access by the user. However, since this invention is designed primarily for an automatic pre-wind of the film on the take-up spool, it is desirable that the pressure plate be latched in its released position when the film chamber door is opened until unlatched after completion of the pre-wind operation in an exemplary manner to be described. This will ensure that the pressure plate will not interfere with the pre-wind operation that could damage the film.

In the illustrated embodiment, the pin 112 is aligned with the center of diamond-shaped opening 54 and the free end of the pin 112 has a semi-circular cut-out 130 (FIG. 8) providing a shoulder 130'. An actuating projection 132 extends from inner surface of the door latching member 52 on the film chamber door 42 and is offset from the center of member 52. This actuating projection 132 abuts the shoulder 130' when the latching member 52 is in its full door latching condition where its diamond-shaped outline is 90° out of alignment with the diamond-shaped aperture 54 in housing side wall 20. Rotation of the diamond-shaped door latching member 52 through a 90° turn in a counterclockwise direction as viewed in FIG. 1 to the door unlatching position thereof will move the control member 110 as projection 132 bears on shoulder 130' from the position illustrated in FIG. 8b to the position illustrated in FIG. 8c. The control member 110 is latched in this latter position as detent 120 enters the detent notch 118. The door is opened for film removal and replacement and upon reclosure of the door and rotation of the door latching member 52 to a door latching position does not rotate the control member 110 because projection 132 then retreats from the shoulder 130' so that the pressure plate remains released. This rotation of the latching member 42 operates a switch to effect a pre-wind operation. After the film has been wound onto the take-up spool, the control member 110 is released and moves to the position illustrated in FIG. 4 by a depression of a button 136 extending from the rear side of the camera (FIG. 2) which momentarily pulls detent 120 from notch 118 where the aforesaid spring returns the member 110 into the position shown in FIG. 4.

As can be appreciated from the above description, the present invention provides a simple and inexpensive means of releasing the pressure plate for film loading and pre-wind operation in a drop-in film loading camera. Of course, various modifications may be made without departing from the spirit of the invention. For example, other means could be utilized to pivot the pressure plate between operative and released positions.

Thus, the film advancing motor can be mounted on a motor drive gear carrying support mounted for movement between two latched positions where the drive gear meshes respectively with gears coupled with the take-up spool and the film cartridge. In such an arrangement, the pivoted lever 90 could be connected to this movable support and moved therewith. A cam on the inside surface of the latching member 52 moves the support motor (and lever 90) into one latched position where the drive gear drives the take-up spool to effect a pre-wind operation and lever 90 moves the pressure plate away from the imaging area whenever the cover is unlocked. Depression of button 136 moves the support member to its other latched position where the drive gear can drive the film cartridge take-up spool and lever 90 is released from the pressure plate.

It should be understood that numerous modifications may be made in the most preferred forms of the invention described and shown in the drawings without deviating from the broader aspects of the invention.

We claim:

1. A still camera including a housing having a film chamber for receiving a film cartridge with a film leader extending therefrom, said chamber defining a film path, a film leader-receiving channel leading from said film path to an outer margin of said housing, said channel being sized to receive and guide said leader upon edgewise insertion thereof, a cavity for receiving said cartridge for drop-in loading in the direction of the plane of the film, said cavity being at one end of said film path, and a cavity housing a take-up spool at the other end of said film path, an imaging area adjacent one side of said film path and a pressure plate in said housing on an opposite side of said film path and generally aligned with the imaging area, biasing means normally biasing said pressure plate towards said imaging area and into an initial position to force film into engagement with a film plane surface thereat, a door closing off said film chamber to cover said channel and cavities and movable between film chamber opening and closing positions, said door having manually-operable door locking and unlocking means movable between door locking and unlocking positions, and plate moving means for moving the pressure plate away from said imaging area to accommodate free movement of the film into said film leader-receiving channel when said door is opened, said plate moving means including means responsive to the movement of said door locking means to its unlocking position for moving said pressure plate away from said imaging area, said plate moving means being such that the film chamber door can be reclosed and locked without returning said pressure plate to said initial position so that the film may be pre-wound at a high speed onto said takeup spool without the pressure plate causing significant friction engagement with the film, and means for moving said pressure plate to said initial position after the film is wound onto the takeup spool.

2. A still camera including a housing having a film chamber for receiving a film cartridge with a film leader extending therefrom, said chamber defining a film path, a film leader-receiving channel leading from said film path to an outer margin of said housing, said channel being sized to receive and guide said leader upon edgewise insertion thereof, a cavity for receiving said cartridge for drop-in loading in the direction of the plane of the film, said cavity being at one end of said film path, and a cavity housing a take-up spool at the other end of said film path, an imaging area adjacent one side of said film path and a pressure plate in said housing on an opposite side of said film path and genreally aligned with the imaging area, biasing means normally biasing said pressure plate towards said imaging area and into an initial position to force film into engagement with a film plane surface thereat, a door closing off said film chamber to cover said channel and cavities and movable between said film chamber opening and closing positions, and plate moving means for moving the pressure plate away from said imaging area to accommodate free movement of the film into said film leader-receiving channel when said door is opened, said pressure plate being pivoted along one edge in said housing and said means for moving the pressure plate including a mechanism for engaging an opposite edge to pivot said pressure plate away from said imaging area.

3. A still camera as defined in claim 2 in which said mechanism includes a lever pivotally supported in said housing adjacent said opposite edge of said pressure plate and means for moving said lever between first and second positions.

4. A still camera as defined in claim 3 in which said mechanism includes biasing means for biasing said lever away from said opposite edge of said pressure plate in said first position.

5. A still camera including a housing having a film chamber for receiving a film cartridge with a film leader extending therefrom, said chamber defining a film path therein with a film leader receiving channel leading from said film path to an edge of said housing, said channel being sized to receive and guide said leader upon edgewise insertion thereof, a cavity for receiving said cartridge for drop-in loading in the direction of the plane of the film, said cavity being at one end of said film path and a cavity housing a take-up spool at the other end of said film path, an imaging area on one side of said film path, a pressure plate generally aligned with said imaging area on an opposite side of said film path, pivot means for pivotally supporting said pressure plate along one edge thereof, and means for pivoting said pressure plate between first and second positions, said pressure plate maintaining the film in engagement with the imaging area in the first position and in said second position accommodating free movement of the film across the imaging area during loading and unloading of the film in the slot, said means for pivoting said pressure plate including a lever pivoted in said housing adjacent an opposite edge of said pressure plate, biasing means biasing said lever to a first position spaced from said opposite edge and means for moving said lever from said first position into engagement with said opposite edge to pivot said pressure plate away from said imaging area.

* * * * *